(12) United States Patent
Fenkanyn et al.

(10) Patent No.: US 10,749,242 B2
(45) Date of Patent: Aug. 18, 2020

(54) NON-PNEUMATIC TIRE WITH RADIO FREQUENCY IDENTIFICATION

(71) Applicant: The Goodyear Tire & Rubber Company, Akron, OH (US)

(72) Inventors: John Michael Fenkanyn, Akron, OH (US); Mario Vincent Orosa, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 163 days.

(21) Appl. No.: 15/797,341

(22) Filed: Oct. 30, 2017

(65) Prior Publication Data

US 2019/0131687 A1    May 2, 2019

(51) Int. Cl.
| | | |
|---|---|---|
| *H01Q 1/22* | (2006.01) | |
| *B60B 9/26* | (2006.01) | |
| *B60C 7/10* | (2006.01) | |
| *B60C 7/14* | (2006.01) | |
| *G06K 19/077* | (2006.01) | |
| *B60C 7/00* | (2006.01) | |
| *B60C 19/00* | (2006.01) | |

(52) U.S. Cl.
CPC ............ *H01Q 1/2241* (2013.01); *B60B 9/26* (2013.01); *B60C 7/10* (2013.01); *B60C 7/14* (2013.01); *G06K 19/07764* (2013.01); *H01Q 1/2225* (2013.01); *B60C 7/00* (2013.01); *B60C 2019/004* (2013.01)

(58) Field of Classification Search
CPC .... B60B 9/26; B60B 9/00; B60B 9/02; B60B 9/04; B60B 9/10; B60B 9/12; B60C 7/00; B60C 7/10; B60C 7/102; B60C 2007/107; B60C 7/14; B60C 2007/146
See application file for complete search history.

(56) References Cited

U.S. PATENT DOCUMENTS

| | | | | |
|---|---|---|---|---|
| 4,235,270 A | * | 11/1980 | Kahaner | ........... B60B 9/12 152/326 |
| 5,573,611 A | * | 11/1996 | Koch | ........ B60C 23/0493 152/152.1 |
| 6,087,930 A | * | 7/2000 | Kulka | ........ B60C 23/0493 340/447 |
| 6,309,494 B1 | * | 10/2001 | Koch | ........ B60C 23/0493 152/152.1 |
| 6,885,291 B1 | * | 4/2005 | Pollack | ........ B60C 23/0433 116/34 R |

(Continued)

FOREIGN PATENT DOCUMENTS

| | | | | |
|---|---|---|---|---|
| WO | 2017/116823 | 7/2017 | ........... | B29D 30/02 |
| WO | 2017/116824 | 7/2017 | ........... | B29D 30/02 |

*Primary Examiner* — Jason R Bellinger
(74) *Attorney, Agent, or Firm* — Edward T. Kennedy

(57) ABSTRACT

A non-pneumatic tire and radio frequency identification tag combination is provided. The combination includes a ground-contacting annular tread, a central rim and at least one spoke disk disposed between the rim and the tread. The at least one spoke disk includes an inner ring mounted on the central rim, an outer ring, and a plurality of spokes extending radially between the inner ring and the outer ring. A shear band is disposed between the outer ring of the at least one spoke disk and the tread. A radio frequency identification tag is attached to the inner ring or the outer ring of the at least one spoke disk.

13 Claims, 7 Drawing Sheets

(56) References Cited

U.S. PATENT DOCUMENTS

| | | | |
|---|---|---|---|
| 7,429,801 B2 | 9/2008 | Adamson et al. | F02B 63/04 |
| 8,115,610 B2 | 2/2012 | Lionetti et al. | B60R 25/10 |
| 8,157,172 B2 | 4/2012 | Fenkanyn | G06K 7/08 |
| 8,176,957 B2* | 5/2012 | Manesh | B60C 7/12 152/301 |
| 9,321,312 B2* | 4/2016 | Asper | B29D 30/02 |
| 2004/0182494 A1* | 9/2004 | Dominak | B60C 23/0493 156/110.1 |
| 2005/0076992 A1* | 4/2005 | Metcalf | H01Q 1/2241 156/110.1 |
| 2006/0097870 A1* | 5/2006 | Choi | B60C 23/0452 340/572.1 |
| 2017/0174014 A1* | 6/2017 | Stewart | B60C 23/0447 |
| 2017/0368879 A1* | 12/2017 | Lettieri | B60C 7/14 |

* cited by examiner

NON-PNEUMATIC TIRE WITH RADIO FREQUENCY IDENTIFICATION

FIELD OF THE INVENTION

The invention relates to non-pneumatic tires. More particularly, the invention relates to radio frequency identification of non-pneumatic tires. Specifically, the invention is directed to a non-pneumatic tire that includes optimum mounting of a radio frequency identification tag to provide stability for the tag and strong transmission of a signal from the tag.

BACKGROUND OF THE INVENTION

In the prior art, pneumatic tires have been widely employed. Such tires include a pair of beads that are mounted on a rim. Each one of pair of sidewalls extends from a respective bead to a ground-engaging tread. The rim, sidewalls and tread define an interior that is inflated with air.

It has been desirable to provide such pneumatic tires with an electronic device that enables information about the tire to be transmitted to an external device for tracking and identification of the tire during its lifetime. One such electronic device is a radio frequency identification (RFID) device, sometimes referred to as an RFID tag.

Most RFID tags contain at least two parts. One part is an integrated circuit for storing and processing information, which includes information that identifies the tire. The second part is an antenna for receiving and transmitting a signal to an external reader. The antenna is electronically connected to the integrated circuit and typically is carried on a substrate with the integrated circuit.

In the prior art, RFID tags have been attached to the sidewall of a pneumatic tire. The sidewall of the pneumatic tire provides a convenient location that enables strong transmission of the signal from the RFID tag to a reader.

In order to address issues associated with prior art pneumatic tires such as maintenance of air pressure, non-pneumatic tires have been developed. Non-pneumatic tires are designed to operate without air pressure. However, many non-pneumatic tires do not have a sidewall or a significant sidewall area. In addition, other structural aspects of certain non-pneumatic tires may create issues with mounting or placement of an RFID tag.

For example, many types of non-pneumatic tires include a polymer webbing that extends between a rim, which is typically formed of steel or other metal, and a tread. The polymer webbing and the tread areas are flexible, and such flexibility does not provide a stable mounting platform for an RFID tag. In addition, mounting of an RFID tag on the rim tends to be problematic, as the steel rim may create a Faraday Cage phenomenon in which the metal of the rim interferes with electromagnetic fields and thus the transmission of a signal from an RFID tag.

As a result, there is a need in the art for a non-pneumatic tire that includes optimum mounting of an RFID tag to provide stability for the tag and strong transmission of a signal from the tag.

SUMMARY OF THE INVENTION

According to an aspect of an exemplary embodiment of the invention, a non-pneumatic tire and radio frequency identification tag combination includes a ground-contacting annular tread, a central rim and at least one spoke disk disposed between the rim and the tread. The at least one spoke disk includes an inner ring mounted on the central rim, an outer ring, and a plurality of spokes extending radially between the inner ring and the outer ring. A shear band is disposed between the outer ring of the at least one spoke disk and the tread, and a radio frequency identification tag is attached to at least one of the inner ring and the outer ring of the at least one spoke disk.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

Figure 1:
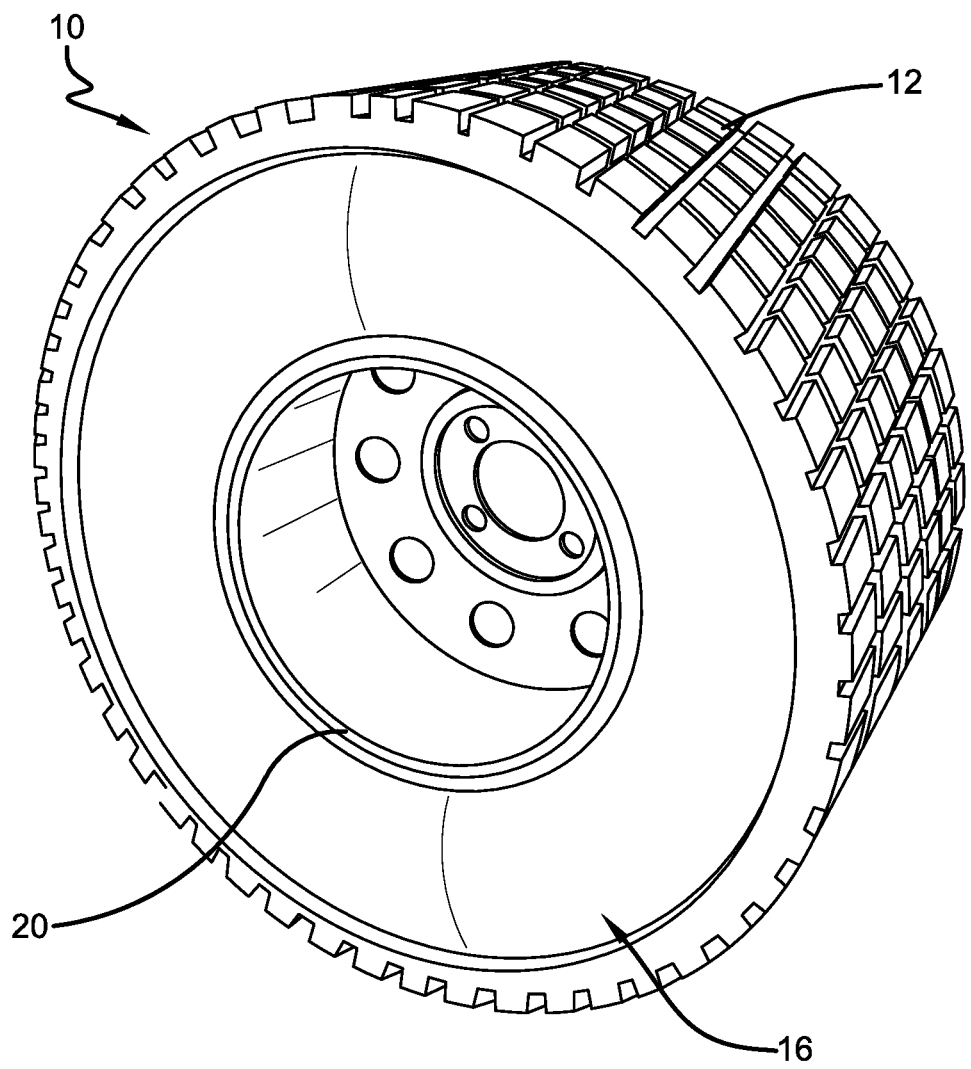
FIG. 1 is a perspective view of an exemplary embodiment of a non-pneumatic tire that includes optimal mounting of an RFID tag.

It is to be understood that the term axially or axial direction refers to the direction that extends parallel to the axis of rotation of the tire, the term radially or radial direction refers to the direction that extends perpendicular to the axis of rotation to the tire, and the term circumferentially or circumferential direction refers to the direction that extends parallel to the direction of rotation of the tire. In addition, the term outboard refers to the axial outer surface of the tire as mounted on a vehicle, and the term inboard refers to the axial inner surface of the tire as mounted on the vehicle.

An exemplary embodiment of a non-pneumatic tire that includes optimal mounting of an RFID tag is shown in FIGS. 1 through 4 and is indicated generally at 10. The non-pneumatic tire 10 includes a radially outer ground engaging tread 12, a shear band 14, one or more spoke disks 16 and 18, and a central rim 20. The tread 12 may include a plurality of longitudinally-oriented grooves which in turn form longitudinal tread ribs therebetween. The ribs may be further divided transversely or longitudinally by grooves to form a tread pattern adapted to the particular design and/or use requirements of the tire 10. The tread grooves may have any depth consistent with the intended use of the tire, and the tread 12 may include elements such as ribs, blocks, lugs, grooves, and sipes as desired to improve the performance of the tire 10 in various conditions.

The shear band 14 preferably is annular and is located radially inward of the tread 12 and radially outward of the spoke disks 16 and 18. The spoke disks 16 and 18 may include different designs. For example, a first type of spoke disk 16 may be a solid disk, while a second type of spoke disk 18 may include a plurality of spokes 22 that extend radially between an inner ring 24 and an outer ring 26. By way of example, each spoke 22 may include at least one first or radially inward spoke member 28 that intersects with at least one second or radially outward spoke member 30 at a joint 32.

In one exemplary construction, one solid spoke disk 16 may be on the axial inboard end of the tire 10 and another solid spoke disk may be on the axial outboard end of the tire, with one or more of the plurality-spoke disks 18 disposed between the solid spoke disks. In another exemplary construction, the tire 10 may include at least two of the plurality-spoke disks 18, and preferably about 6 to about 8 of the plurality-spoke disks, with no solid spoke disks 16. The tire 10 may include different combinations of spoke disks 16 and 18, different constructions of the spoke disks, and different rotational orientations relative to one another, as dictated by specific design considerations.

In this manner, the non-pneumatic tire 10 includes the central rim 20 with spoke disks 18 disposed concentrically and axially along an outer surface 34 of the rim. The spoke disks 18 preferably engage the rim 20 via an adhesive bond between a radially innermost surface 36 of each spoke disk and the radially outer surface 34 of the rim 20. The shear band 14 is disposed concentrically over the axially disposed spoke disks 18. The shear band 14 preferably engages the spoke disks 18 via an adhesive bond between a radially innermost surface 38 of the shear band 14 and a radially outermost surface 40 of each spoke disk 18. The tread 12 radially overlays the shear band 14 and preferably is bonded to the shear band via co-curing of the elastomer compositions.

The non-pneumatic tire 10 is more fully described in application Ser. No. 15/581,438, bearing U.S. Patent Application Publication No. 2017/0368879, which is owned by the same Assignee as the present invention, the Goodyear Tire & Rubber Company, and is hereby incorporated by reference.

An exemplary RFID tag is shown in FIGS. 2 through 5 and is indicated generally at 42. The RFID tag 42 includes a body 44 that is at least partially made of a polymer, and typically is semi-rigid in its construction. Housed within the body 44 of the RFID tag 42 is an integrated circuit and/or a printed circuit board for storing and processing tire identification information, and for modulating and demodulating a radio frequency signal. An antenna for transmitting a signal to, and optionally for receiving a signal from, an external reader preferably is also housed within the body 44 of the RFID tag 42.

The body 44 may also house one or more devices or sensors for detecting one or more of pressure, temperature, strain, or conductivity in the tire 10. In such a case, the devices or sensors preferably are electronically connected to one another. For example, the RFID tag 42 may be used to identify the tire 10, may provide other information about the tire, and/or the condition of the tire depending upon what type of, if any, additional electronic sensors are electronically connected to the tag.

Figure 2:
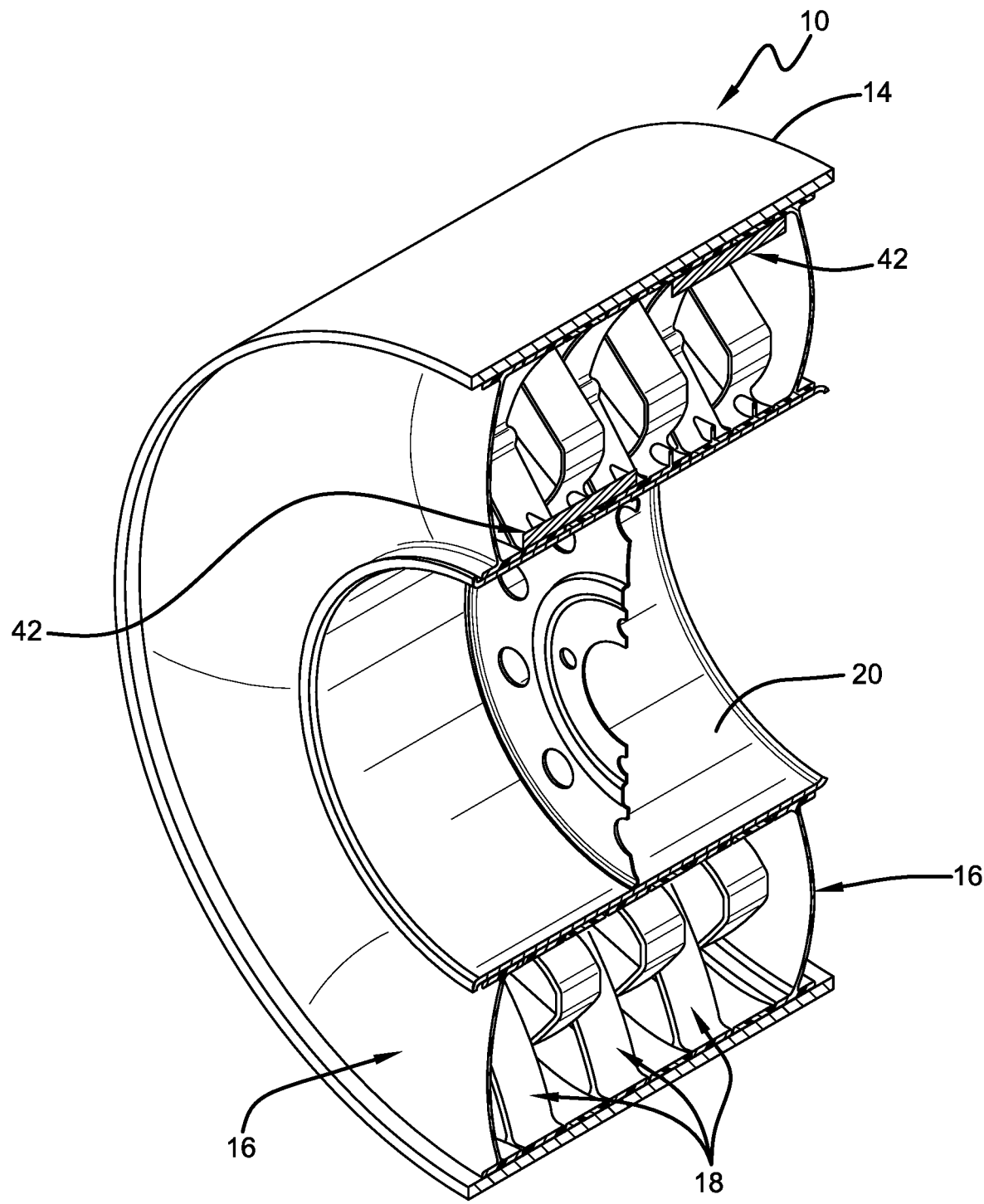
FIG. 2 is a cross-sectional view of a portion of the non-pneumatic tire shown in FIG. 1.
Figure 3:
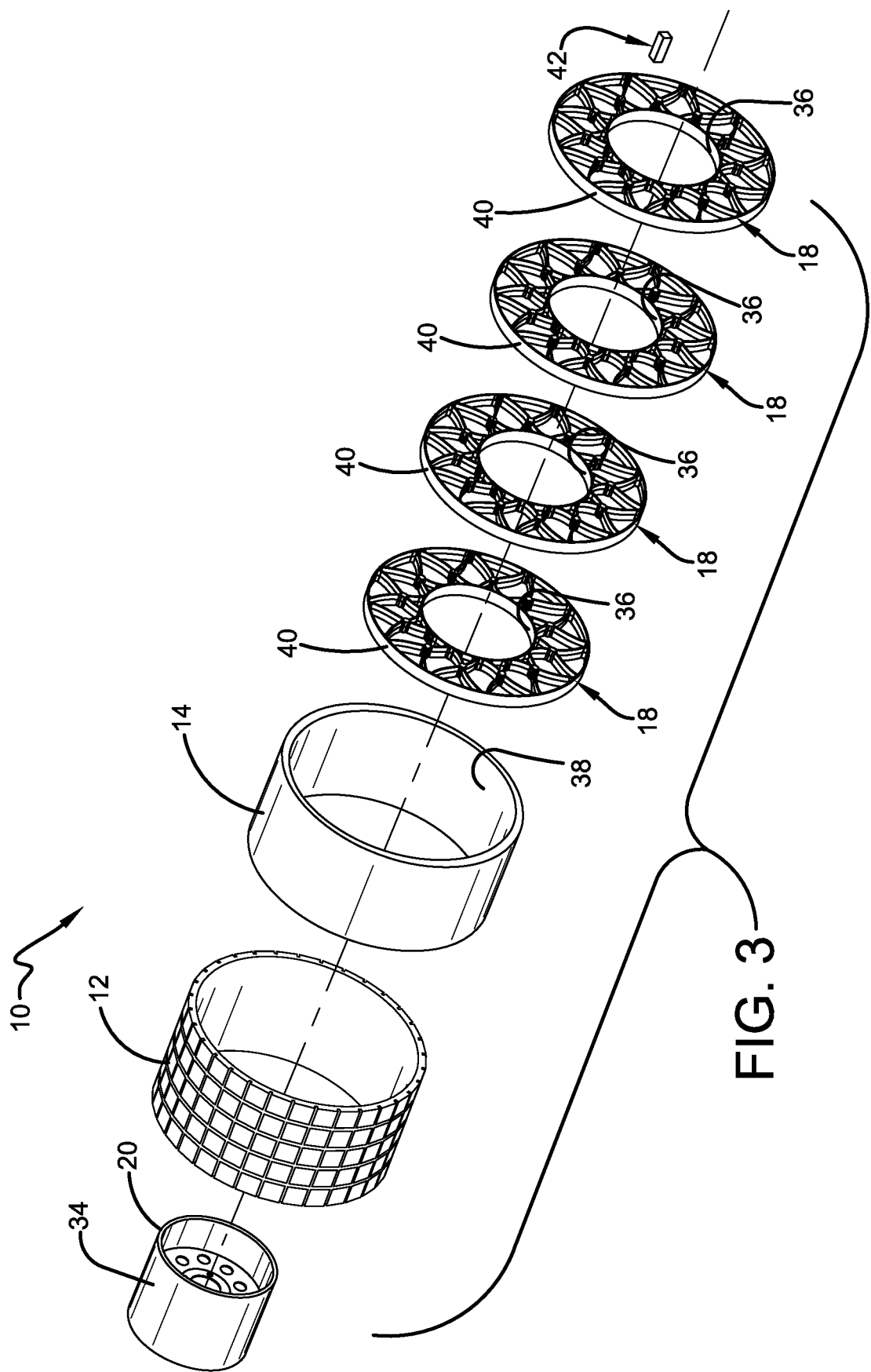
FIG. 3 is an exploded view of a portion of the non-pneumatic tire shown in FIG. 1.
Figure 4:
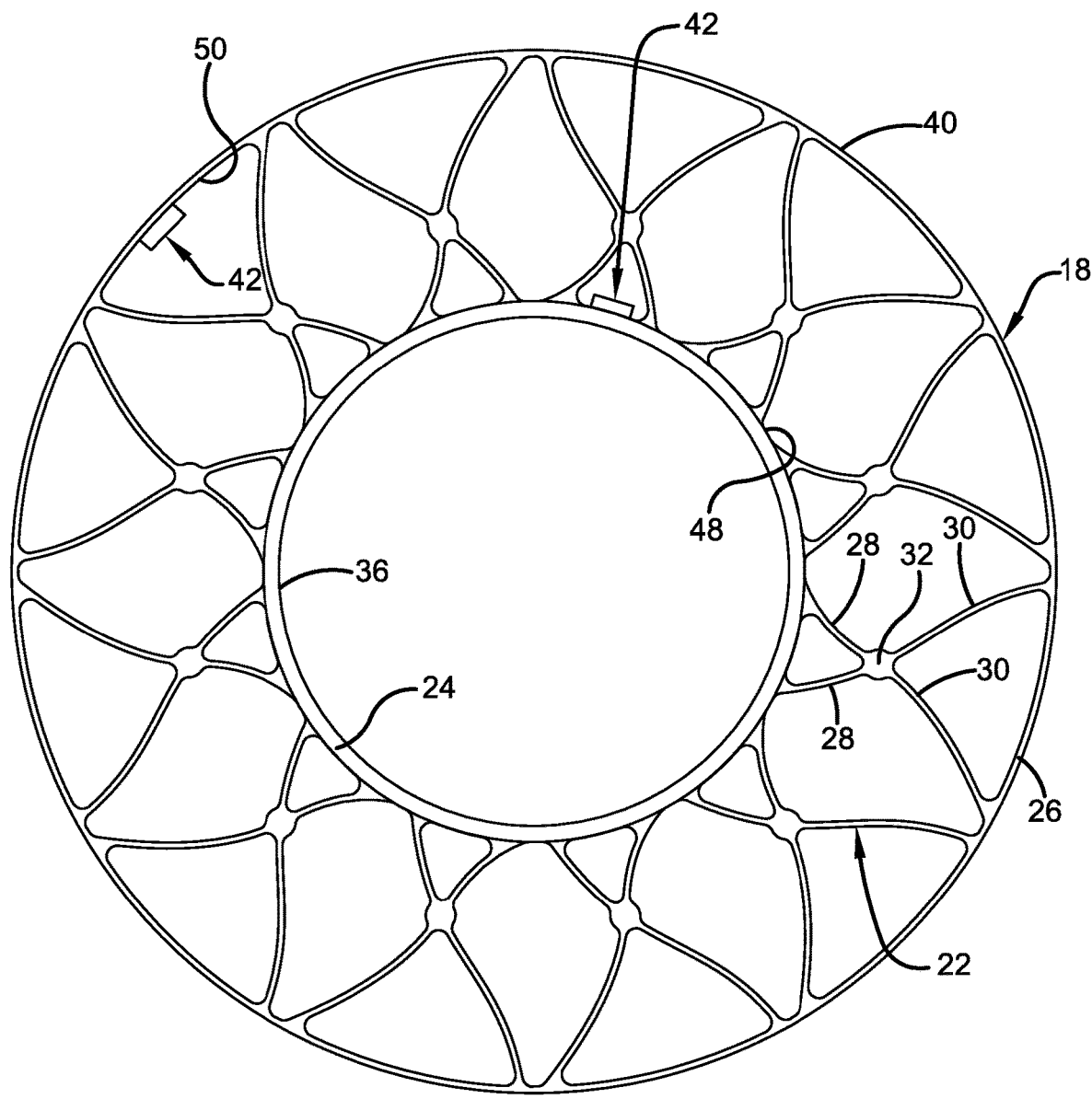
FIG. 4 is a perspective view of an exemplary spoke disk from the non-pneumatic tire shown in FIG. 1.
Figure 5:
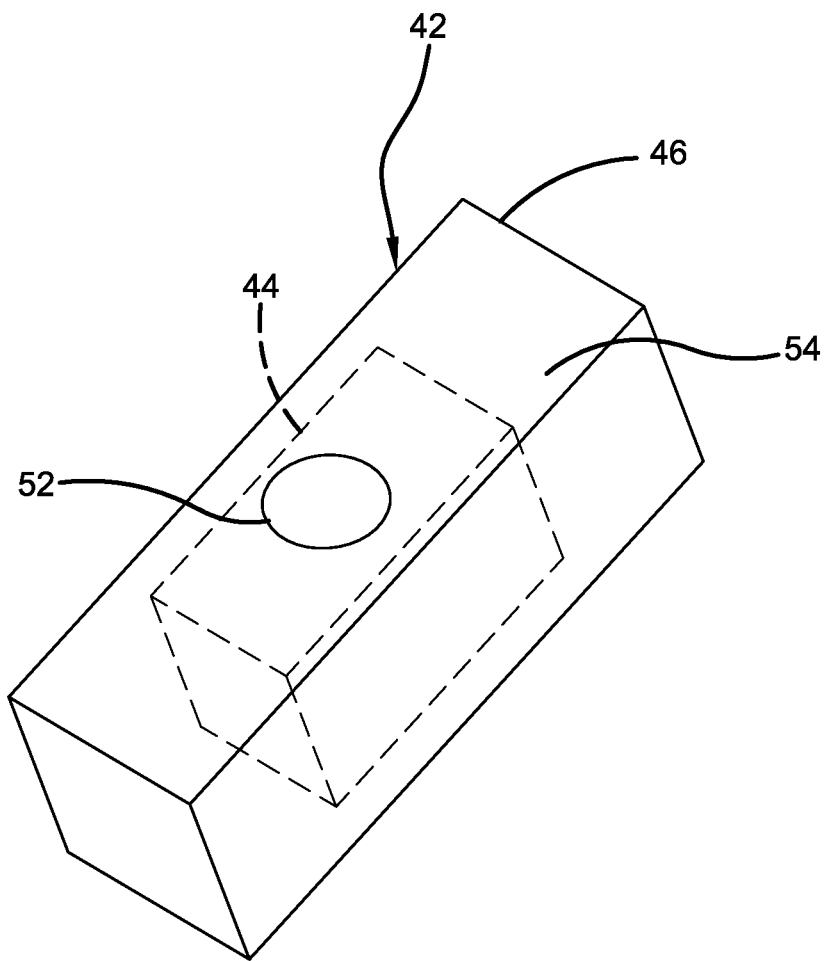
FIG. 5 is a perspective view of the RFID tag shown in FIG. 2.
Figure 6:
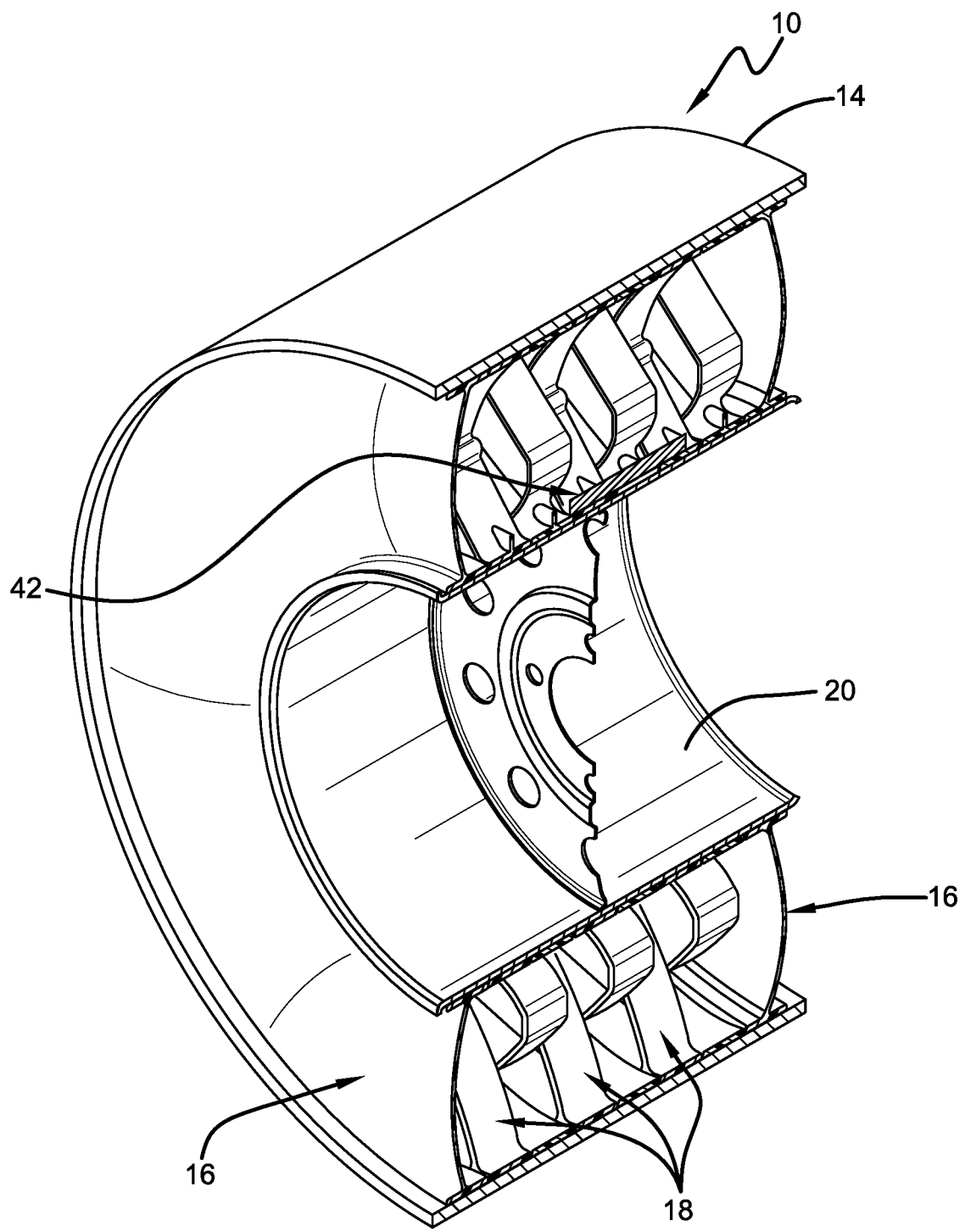
FIG. 6 is a cross-sectional view of a portion of the non-pneumatic tire shown in FIG. 1 with an alternative position of the RFID tag.

Preferably, the body 44 of the RFID tag 42 is encapsulated in a rubber or polymer sheath 46 to provide flexibility and enhance adhesive bonding of the tag to the tire 10, as will be described in greater detail below. As shown in FIGS. 2 through 4, the sheath 46, and thus the RFID tag 42, is attached to one or more of the spoke disks 18. One preferred location for the RFID tag 42 is on the radially outer surface 48 of the inner ring 24 of one or more of the spoke disks 18, extending axially across the spoke disks. The radially outer surface 48 of the inner ring 24 provides a minimally-flexing, stable mounting platform for the RFID tag 42. In this manner, the RFID tag 42 is disposed radially outwardly of the rim 20 to enable strong transmission of a signal from the tag, and inboardly of the tread 12 to mount the tag in the protected interior of the tire 10 to optimize its life. The RFID tag 42 may be disposed across axially inboard spoke disks 18 (FIG. 2), axially outboard spoke disks (FIG. 2) or axially central spoke disks (FIG. 6).

Figure 7:
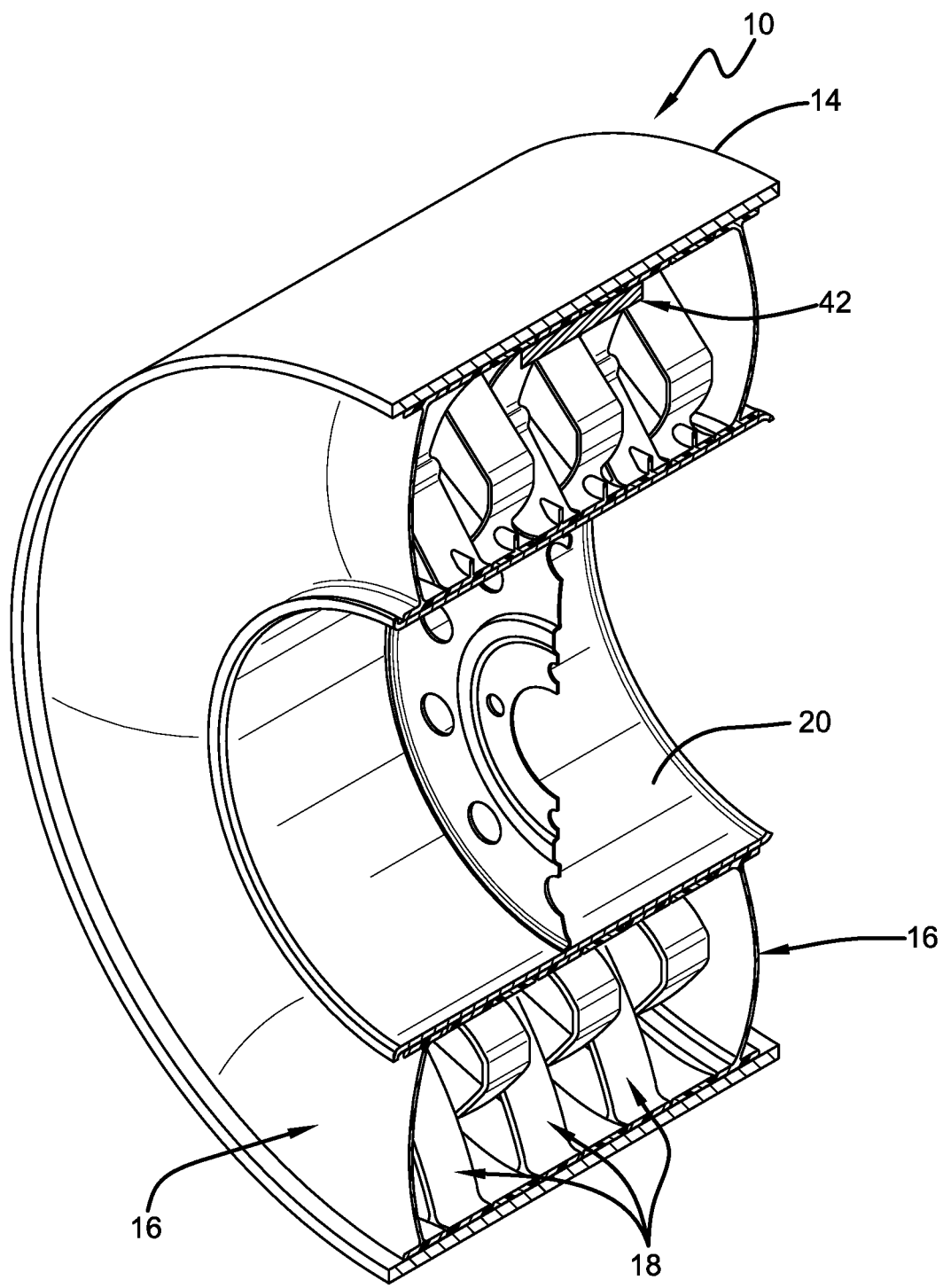
FIG. 7 is a cross-sectional view of a portion of the non-pneumatic tire shown in FIG. 1 with another alternative position of the RFID tag.

An alternative preferred location for the RFID tag 42 is on the radially inward surface 50 of the outer ring 26 of one or more of the spoke disks 18, extending axially across the spoke disks. The radially inward surface 50 of the outer ring 26 provides a minimally-flexing, stable mounting platform for the RFID tag 42. In this manner, the RFID tag 42 is disposed radially outwardly of the rim 20 to enable strong transmission of a signal from the tag, and just below or inboardly of the tread 12 to mount the tag in the protected interior of the tire 10 to optimize its life. The RFID tag may be disposed across axially inboard spoke disks 18 (FIG. 2), axially outboard spoke disks (FIG. 2) or axially central spoke disks (FIG. 7).

A feature 52 is molded into a top surface 54 of the sheath 46 which is used to enable optimum positioning of the RFID tag 42. More particularly, it is desirable to maintain a standoff distance between the RFID tag 42 and the metal rim 20 to minimize interference of the metal rim with the transmission of a signal from the tag. The RFID tag body 44 is mounted in the sheath 46 near the top surface 54 of the sheath, creating an additional insulating layer in the sheath below the RFID tag 42 and creating the desired standoff distance. The feature 52 aids in the positioning of the RFID tag 42 by indicating the surface 54 of the sheath 46 that is adjacent the tag. The sheath 46, as mentioned above, is formed of an elastomer or polymer, and is a radio-frequency friendly encasing material to enable ready transmission of signals from the RFID tag 42.

The sheath 46 is attached to the radially outer surface 48 of the inner ring 24 of one or more of the spoke disks 18 or to the radially inward surface 50 of the outer ring 26 of one or more of the spoke disks by an adhesive. Preferably, the adhesive is the same adhesive used to bond the spoke disks 18 to the rim 20 and/or to bond the shear band 14 to the spoke disks. The adhesive is an appropriate adhesive that bonds effectively between elastomers and thermoplastics. For example, the adhesive may be of a cyanoacrylate type adhesive comprising an alkyl-2-cyanoacrylate monomer. The alkyl group may include from one to ten carbon atoms, in linear or branched form. The alkyl-2-cyanoacrylate monomers may include methyl-2-cyanoacrylate, ethyl-2-cyanoacrylate, butyl-2-cyanoacrylate, and octyl-2-cyanoacrylate. An exemplary adhesive includes an ethyl-2-cyananoacrylate available as Permabond® 268.

In this manner, the non-pneumatic tire 10 includes optimal mounting of an RFID tag 42 in the interior of the tire members and thus in a protected environment, maximizing the life of the tag. By being encapsulated in the sheath 46, the RFID tag 42 is mounted in a semi-rigid structure that is stable, yet provides some ability to flex with the tire 10. Moreover, no modifications to the structure of the tire 10 are needed to accommodate the RFID tag 42.

The present invention also includes a method of forming and/or using a non-pneumatic tire 10 that includes optimal mounting of an RFID tag 42. The method includes steps in accordance with the description that is presented above and shown in FIGS. 1 through 5.

It is to be understood that the structure of the above-described non-pneumatic tire 10 that includes optimal mounting of an RFID tag 42 may be altered or rearranged, or components known to those skilled in the art omitted or added, without affecting the overall concept or operation of the invention. The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A non-pneumatic tire and radio frequency identification tag combination, the combination comprising:
    a ground-contacting annular tread;
    a central rim;
    a plurality of spoke disks disposed between the rim and the tread, each spoke disk in the plurality of spoke disks including an axial length, an inner ring mounted on the central rim, an outer ring, and a plurality of spokes extending radially between the inner ring and the outer ring;
    a shear band being disposed between the outer ring of the each one of the plurality of spoke disks and the tread;
    a radio frequency identification tag including a body, the body including an axial length greater than the axial length of each individual spoke disk, the body being encapsulated in a flexible sheath; and
    the body being disposed axially across at least two spoke disks of the plurality of spoke disks, wherein the sheath is attached to at least one of the inner ring and the outer ring of each of the at least two spoke disks.

2. The non-pneumatic tire and radio frequency identification tag combination of claim 1, wherein the spokes include a first spoke member and a second spoke member being connected at a joint.

3. The non-pneumatic tire and radio frequency identification tag combination of claim 1, wherein the plurality of spoke disks includes at least 4 spoke disks.

4. The non-pneumatic tire and radio frequency identification tag combination of claim 1, wherein the sheath is attached to the at least one of the inner ring and the outer ring of each of the at least two spoke disks by an adhesive.

5. The non-pneumatic tire and radio frequency identification tag combination of claim 1, further comprising a feature being molded into a top surface of the sheath.

6. The non-pneumatic tire and radio frequency identification tag combination of claim 1, wherein the radio frequency identification tag is attached to a radially outer surface of the inner ring of each of the at least two spoke disks.

7. The non-pneumatic tire and radio frequency identification tag combination of claim 6, wherein the radio frequency identification tag is disposed axially across at least two axially inboard spoke disks.

8. The non-pneumatic tire and radio frequency identification tag combination of claim 6, wherein the radio frequency identification tag is disposed axially across at least two axially outboard spoke disks.

9. The non-pneumatic tire and radio frequency identification tag combination of claim 6, wherein the radio frequency identification tag is disposed axially across at least two axially central spoke disks.

10. The non-pneumatic tire and radio frequency identification tag combination of claim 1, wherein the radio frequency identification tag is attached to a radially inward surface of the outer ring of each of the at least two spoke disks.

11. The non-pneumatic tire and radio frequency identification tag combination of claim 10, wherein the radio frequency identification tag is disposed axially across at least two axially inboard spoke disks.

12. The non-pneumatic tire and radio frequency identification tag combination of claim 10, wherein the radio frequency identification tag is disposed axially across at least two axially outboard spoke disks.

13. The non-pneumatic tire and radio frequency identification tag combination of claim 10, wherein the radio frequency identification tag is disposed axially across at least two axially central spoke disks.

* * * * *